United States Patent [19]

George et al.

[11] 4,147,224
[45] Apr. 3, 1979

[54] BATHROOM SCALES

[75] Inventors: Peter A. George, Harpole; Harold Crystal, Boothville, both of England

[73] Assignee: Plessey Handel und Investments AG, Zug, Switzerland

[21] Appl. No.: 798,481

[22] Filed: May 19, 1977

[30] Foreign Application Priority Data

May 20, 1976 [GB] United Kingdom ............... 20900/76
Mar. 30, 1977 [GB] United Kingdom ............... 13344/77

[51] Int. Cl.² .............................................. G01G 3/14
[52] U.S. Cl. .................................. 177/210 FP; 364/573
[58] Field of Search ................... 177/210 FP, DIG. 3; 364/573

[56] References Cited

U.S. PATENT DOCUMENTS 3,011,572 12/1961 Bellier ...................... 177/210 FP X
3,963,082 6/1976 Meier ............................ 177/210 FP

FOREIGN PATENT DOCUMENTS

916110 1/1963 United Kingdom ............... 177/210 FP

Primary Examiner—George H. Miller, Jr.
Attorney, Agent, or Firm—Fleit & Jacobson

[57] ABSTRACT

Apparatus for weight measurement comprising a wire mounted for tensioning by a weight to be measured, means for resonating the wire, means for measuring the frequency of resonation, at least one programmable read only memory (PROM) fed from the means for measuring the frequency of resonation and programmed to provide output signals indicative of the weight applied to the wire, and digital display means fed from said PROM.

9 Claims, 12 Drawing Figures

BATHROOM SCALES

This invention relates to weightload, or stress measurements, and in particular to electronic weighing apparatus which provides a digital read-out of weight.

In known weighing or stress measurement apparatus the load is placed on a platform and via a series of levers the load moves a scale relative to a fixed printer thus providing an analogue read-out.

It is an object of the present invention to provide weightload or stress measurement apparatus which provides a digital read-out and also to provide apparatus which is portable and battery powered.

According to the present invention apparatus for weight measurement comprising a wire mounted for tensioning by a weight to be measured, means for resonating the wire, means for measuring the frequency of resonation, at least one programmable read only memory (PROM) fed from the means for measuring the frequency of resonation and programmed to provide output signals indicative of the weight applied to the wire and digital display means fed from said PROM. Preferably the frequency of resonation is measured digitally.

In the present invention the term wire is used to cover both single and multiple stranded wire and the cross section of the wire not restricted to circular cross section.

The apparatus according to the invention may be a battery powered electric weighing machine and may include a switch responsive to the application of weight to the platform of such machine for switching on the digital electric indicator. This enables the battery drain to be minimized and gives a longer period between battery charges.

The means for resonating the wire may comprise means for vibrating the wire, a sensor for sensing the frequency of vibration the sensor and transducer being connected in a positive feedback loop whereby the wire is maintained in oscillation at its resonant frequency.

The wire may be arranged to carry an A.C. current the means for vibrating the wire comprising a magnet positioned adjacent the wire so that the wire is constrained to vibrate when the A.C. current is passed through it, the sensor comprising a pickup coil positioned in the vicinity of the wire so as to have induced in it a voltage at the frequency of vibration, and the voltage being amplified and applied to the wire to produce said A.C. current. Thus in this manner a positive feedback loop is defined by means of which vibration of the wire is maintained at its resonant frequency, and an electrical signal is also produced at this frequency which is available for measurement.

The wire may alternatively be arranged to carry a D.C. current and in this case the wire would be placed in the field of an electric coil to which the A.C. current is fed, the coil to which the A.C. current is fed being included in the positive feedback loop.

A binary counter may be provided for counting the frequency of resonation, signals from the counter being fed to the PROM (or PROMS) which is arranged to feed via a latch decoder an L.E.D. display.

Embodiments of the invention will now be described by way of example with reference to the accompanying drawings in which.

Figure 1:
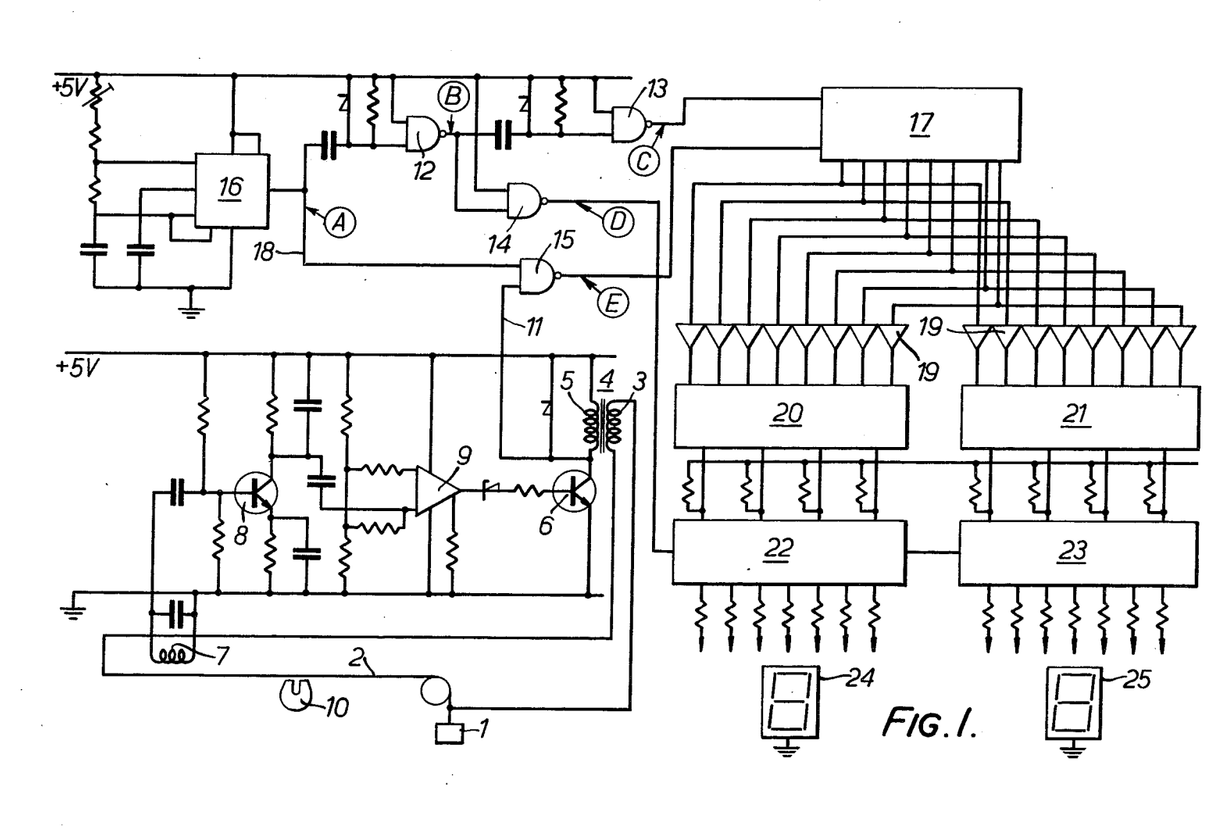
FIG. 1 is a block/circuit diagram of weighing apparatus.
Figure 2:
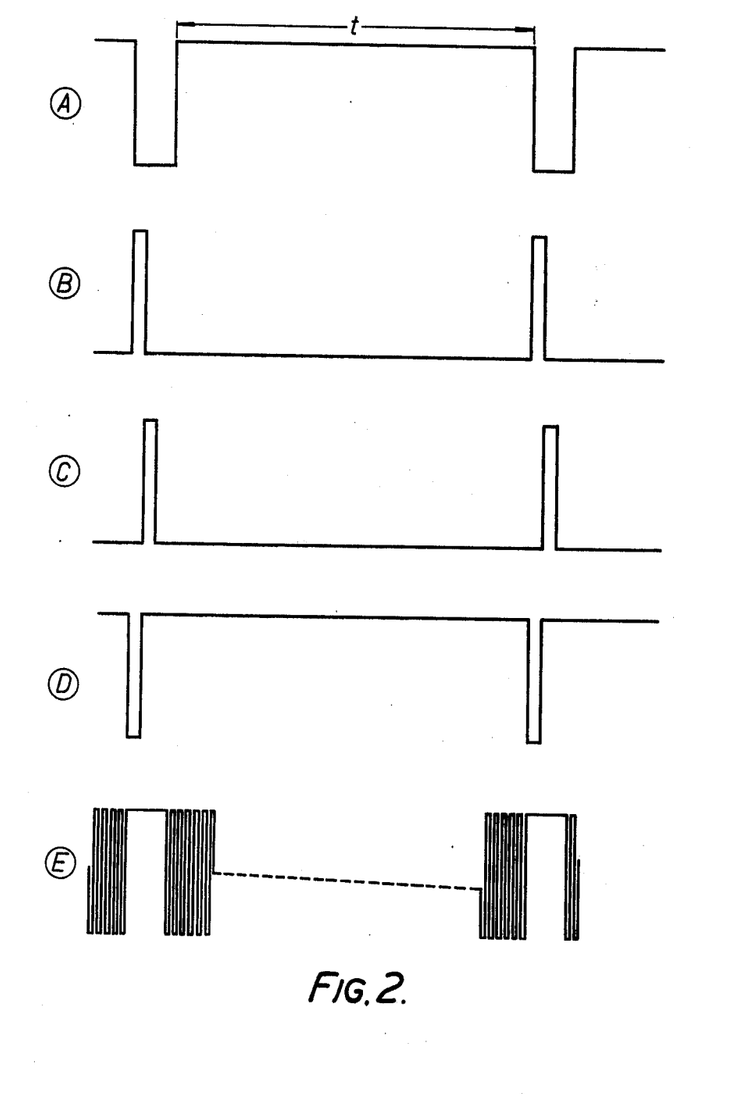
FIG. 2 is a waveform diagram appertaining to the circuit/block diagram shown in FIG. 1.

Referring now to FIGS. 1 and 2 of the drawings, a weight 1 which may be the weight applied to the platform of bathroom scales is applied to tension a wire 2. The wire 2 is connected in series with the secondary winding 3 of a transformer 4 the primary winding 5 of which is fed from a transistor 6. The transistor 6 is fed with signals from a pickup coil 7 via a transistor 8 and an amplifier 9 such that the pickup coil 7, transistor 8, amplifier 9, transistor 6 and transformer 4 define between them a positive feedback loop. The wire 2 is positioned adjacent a permanent magnet 10 and in operation of the apparatus vibration of the string 2 at its natural resonant frequency causes a voltage to be induced in the pickup coil 7 which in turn results in an A.C. voltage at the same frequency being applied via the secondary winding 3 of the transformer 4 to the wire 2. Thus the wire 2 will be constrained to resonate and be maintained in oscillation by operation of the positive feedback loop. An electrical signal which corresponds in frequency to the rate of mechanical vibration of the string 2 is fed via line 11 to a gating system comprising gates 12, 13, 14 and 15 fed also from a gating oscillator 16 such that an 8-stage binary counter 17 is fed with signals from the line 11 for periods of time determined by the oscillator 16. In operation of the circuit the 8-stage binary counter 17 receives pulses from the line 11 via the gate 15 for a period time determined by a gating waveform A fed from the oscillator 16 on line 18. The gating waveform A is shown in FIG. 2. The counter 17 is re-set by a waveform C shown in FIG. 2 which is derived via gates 12 and 13. Thus the counter 17 is arranged to count for a period T, as shown in FIG. 2, waveform A, pulses originating from the line 11 at the frequency of oscillation of the string 2. Signals from the binary counter 17 are fed via buffers 19 to PROMS 20 and 21. The PROMS are programmed to receive data from the counter and provide an output signal corresponding to the actual weight measured. The PROMS feed via latch decoders 22 and 23 and L.E.D. display 24, 25 which may for example be calibrated in kilograms. The latch decoders 22 and 23 are re-set by the pulses of waveform D which are derived via gate 14. Thus each time the latch decoders 22 and 23 receive a pulse via the gate 14 the display is updated. Various modifications may be made to the arrangement shown without departing from the scope of the invention and it will be appreciated that the signal produced corresponding to the frequency and vibration of the wire may be produced in any convenient way. Although in the foregoing example an 8-stage binary counter has been utilised it will be understood that any suitable counter may be used for feeding the PROMS 20 and 21.

It is contemplated that the arrangement hereinbefore described may be used to provide bathroom scales in which the display is provided by means of an L.E.D. panel. The scales would be normally provided with a battery so that they are transportable and in order to extend battery life a switch would be provided responsive to a weight being applied to the platform of the scales for switching on the L.E.D. display or circuitry associated with the display. The display may be situated on the bathroom scales proper or alternatively the display may be carried in a sub housing which communicates with the weighing platform by means of a wire or cable. Although an L.E.D. display panel is particularly suitable for the present application it is envisaged that other digital display such as liquid crystal display panels may alternatively be utilised.

FIGS. 3 to 6 show an alternative improved form of circuitry suitable for a set of bathroom scales and FIGS. 8 to 11 show a practical embodiment of some of the mechanical features of such scales.

Figure 3:
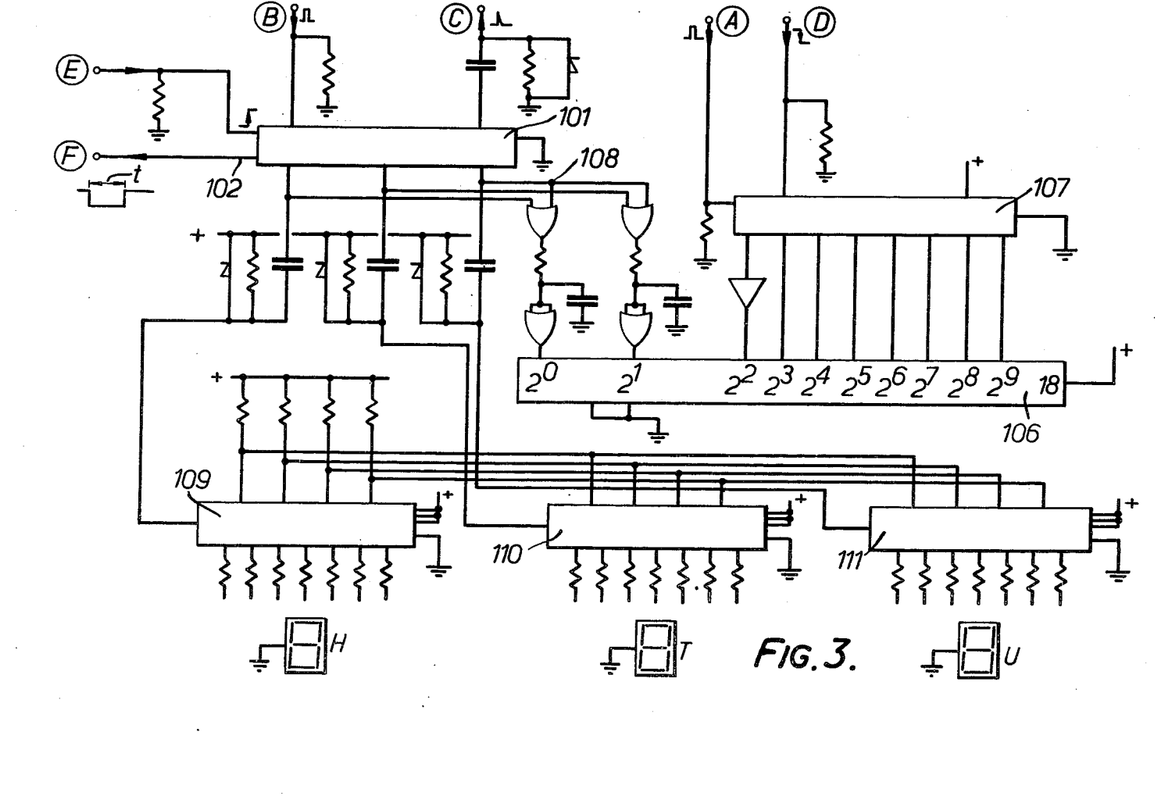
FIG. 3 shows part of the alternative electronic circuitry which is mounted on a first printed circuit board.
Figure 4:
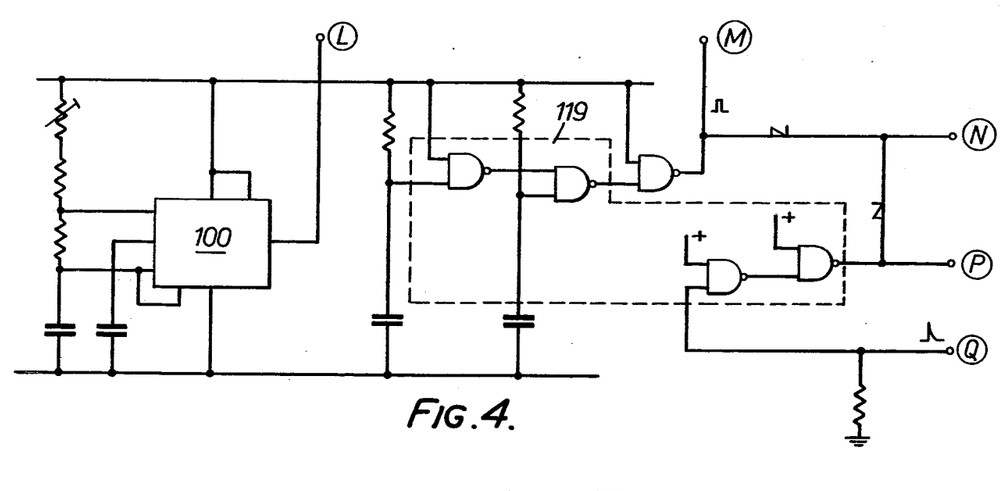
FIG. 4 shows part of the alternative electronic circuitry which is mounted on an auxiliary printed circuit board.
Figure 5:
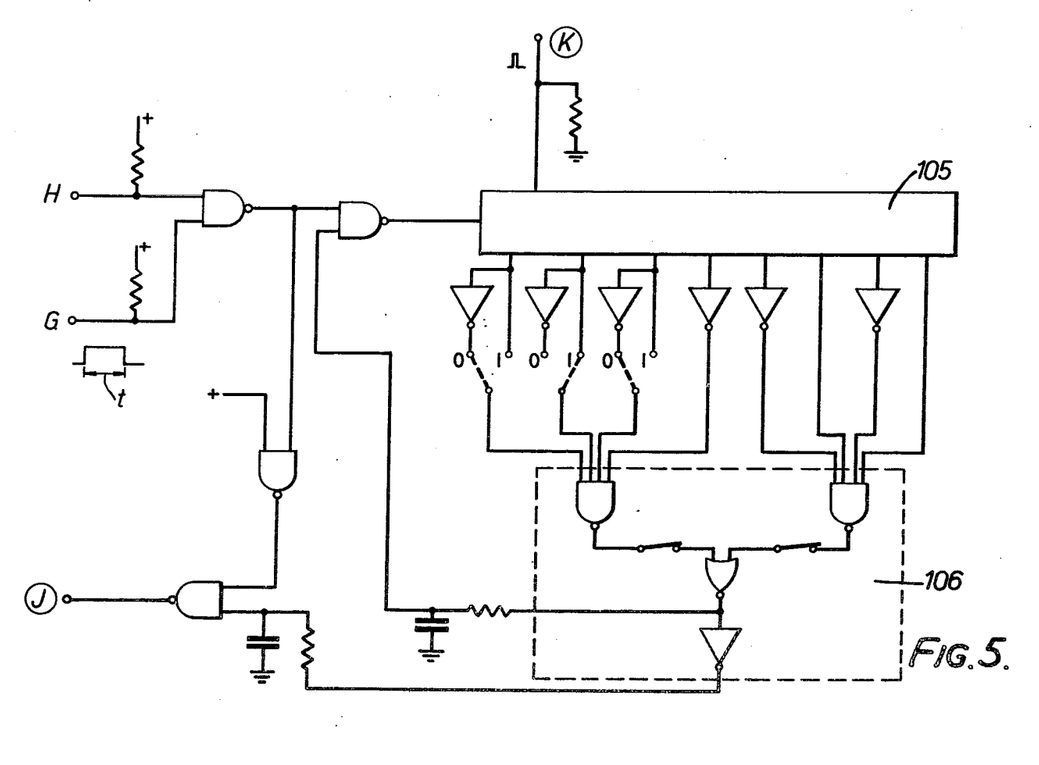
FIG. 5 shows pulse subtraction circuitry mounted on a further printed circuit board.
Figure 6:
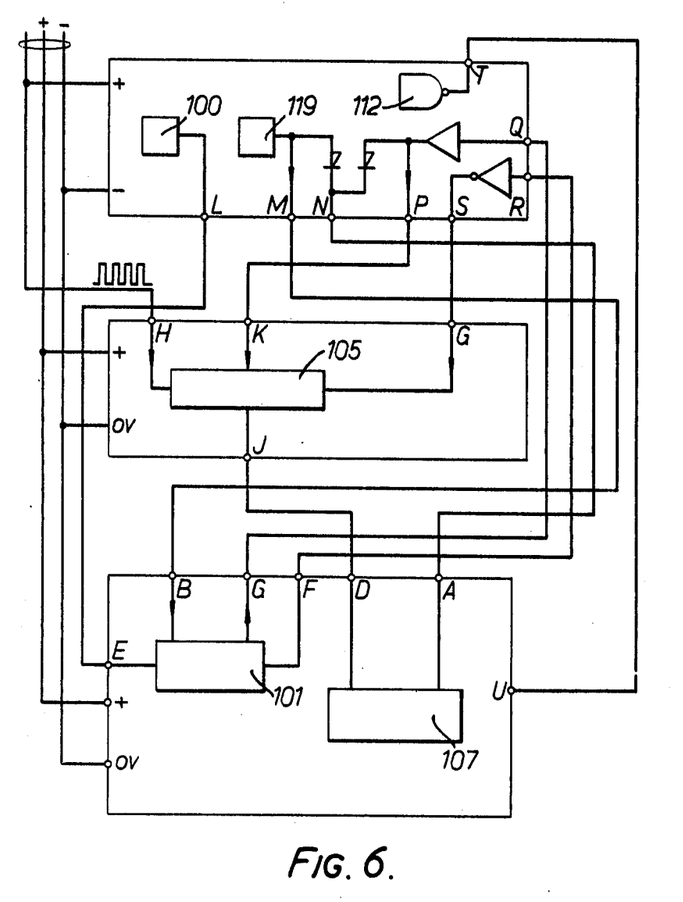
FIG. 6 shows the interconnections between the printed circuit boards of FIGS. 1, 2 and 3.
Figure 7:
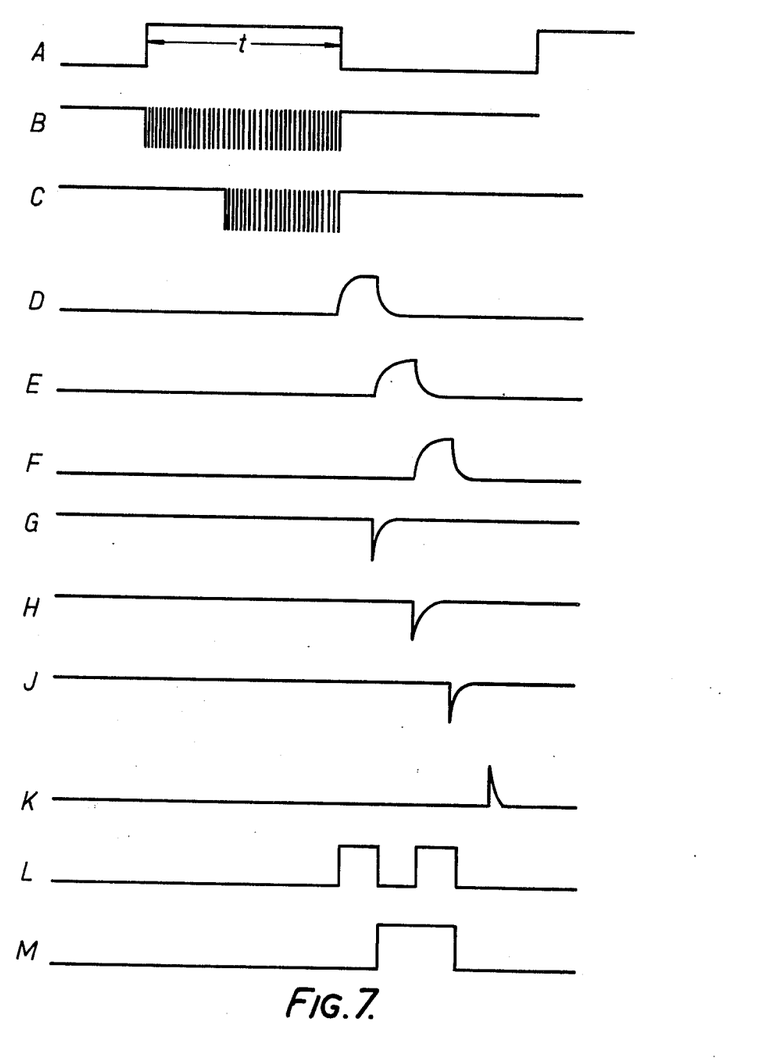
FIG. 7 shows waveform diagrams illustrating the operation of the circuitry of FIGS. 3 to 6.

Referring now to FIGS. 3, 4 and 5, the sequence of operation of the circuitry is controlled by pulses generated by an integrated circuit oscillator 100 which produces pulses at 10.75 Hz which are fed to a decade divider 101. An output 102 of divider 101 is used as a gating signal (see waveform FIG. 7A). This signal is ANDED together with the output of the wire oscillator in an integrated circuit gate 104 (FIG. 5) to produce a burst of pulses (waveform FIG. 7B). Integrated circuits 105 (Binary Divider) 106 and part of 104 are used as a pulse subtracting circuit. The first 162 counts are absorbed by this subtracting circuit, this representing a 400 Hz pre-load signal and ensures that the ROM 106 (FIG. 3) starts at the address zero for zero load. The "burst" pulse waveform with the 162 pulses subtracted is symbolically shown in FIG. 7C. These pulses are then fed to an 8-stage binary counter 107, this counter being zeroed before each cycle of the count (waveform 7K). The counter 107 thus will count the burst of pulses up to a maximum of 255. For practical purposes the full scale weight deflection is set at 250. The ROM may be programmable to facilitate alteration of ranges and/or different weight systems e.g., kgs; stress/lbs, etc. The outputs of the counter 107 are fed to the ROM address as the eight most significant digits of the address, the first two least significant digits being fed from the divide by 10 counter 101. Three pulses from 101 as shown in waveforms 7D, 7E and 7F are combined in integrated circuit 108 to produce waveforms shown in FIGS. 7L and 7M. These waveforms are fed to the first two significant digits of the ROM in order to cycle the ROM through the four blocks of memory which cover the hundreds, tens, and units digits. (The fourth block of memory addressable by 0.0 is not used.) As the memory blocks are addressed the outputs are sequentially latched by pulses G, H and J (FIG. 7) which are derived from the negative going edges of pulses FIGS. 7D, 7E and 7F. The counter (107) is, as explained, reset once per cycle by pulse FIG. 7K. The latched outputs are used to address integrated circuit display drivers 109, 110, 111.

Figure 4A:
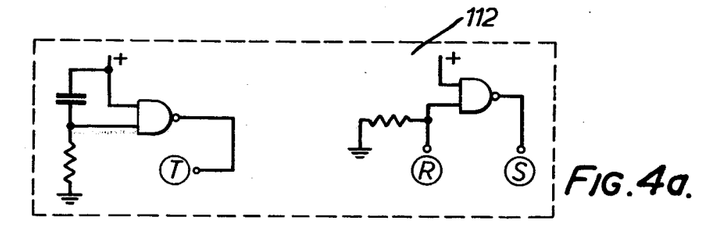

To prevent false readings at the instant of switch on a part of the integrated circuit 112 (FIG. 4a) produces a short time delay which blanks the display until the first latching sequence is completed.

Two sections of integrated circuit 119 (QUAD NAND GATE) produce an initialize pulse a few milliseconds after the supply is established. This pulse resets the counter 101 and ensures that it starts at the correct point.

The adjustment of the zero point (see also FIG. 9) is achieved mechanically to give a frequency of 400 Hz, the zero reading being programmed to display 000.

TABLE 1

| A | B | C | COUNT |
|---|---|---|-------|
| 0 | 0 | 0 | 160 |
| 1 | 0 | 0 | 161 |
| 0 | 1 | 0 | 162 |
| 1 | 1 | 0 | 163 |
| 0 | 0 | 1 | 164 |
| 1 | 0 | 1 | 165 |
| 0 | 1 | 1 | 166 |
| 1 | 1 | 1 | 167 |

Table 1 shows how by alteration of links a, b and c in FIG. 5 the subtracted count can be adjusted.

Figure 8:
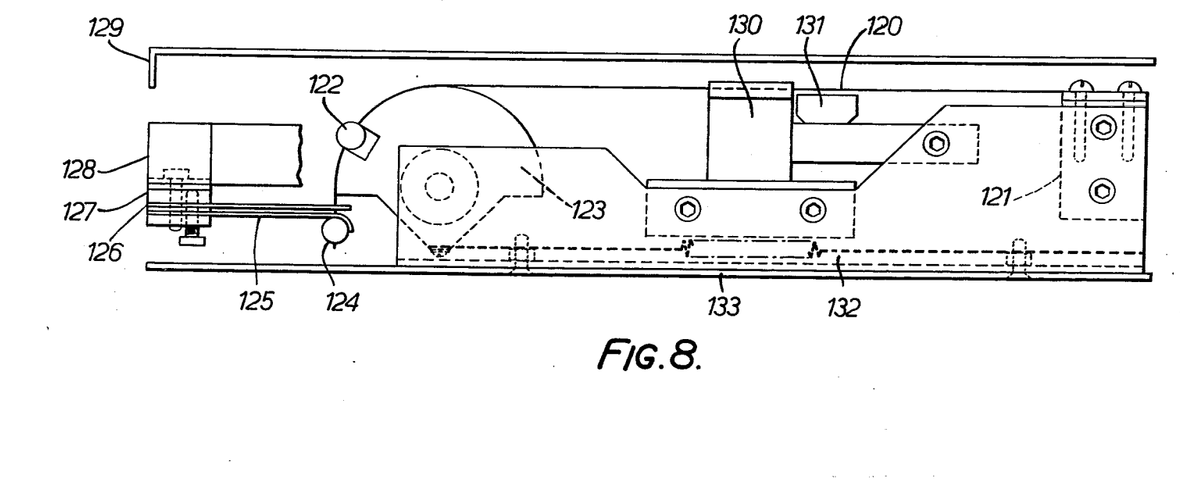
FIG. 8 shows one arrangement of the vibrating wire suspension system.

Referring now to FIG. 8, there is shown diagrammatically in side elevation the major parts of an arrangement suitable for bathroom or other scales. A wire 120 is stretched between a first main anchorage point 121 and a second rod shaped guidance anchorage point 122 on a segment shaped semi-circular pulley 123. A further anchorage point on the wire 124 is in contact with a first (main) spring lever 125. A second (back up) spring 126 is mounted parallel to and in a spaced apart relationship to the first spring 125. This arrangement is shown and hereinafter described in greater detail with reference to FIG. 9. To a further spacer 127 is attached the main weight load point 128 of the weighing apparatus, the weight being initially placed on the top platform 129 and transferred by a leverage system (not shown) to the main weight point 128.

A magnet assembly 130 and pick coil assembly 131 are mounted adjacent to a point along the length of the wire. (The magnet being positioned adjacent to the centre of the vibrating portion of the wire.) The magnet assembly, and segment shaped semi-circular pulley are both mounted on a base frame member 132 which is in turn mounted on a base plate 133.

Figure 9:
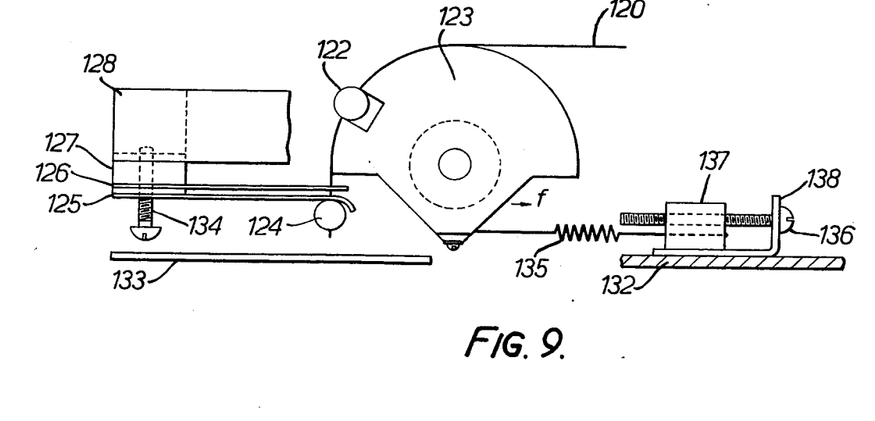
FIG. 9 shows an overload protection and zero correction arrangement for the suspension system of FIG. 8.

The overload and zeroing arrangement will now be described with reference to FIG. 9.

Calculations show that if the wire 120 is sufficiently strong to withstand the expected dynamic loading during overload or shock load conditions it would have to be thick. An overload protection system is, therefore, incorporated.

The normal force is applied to the wire from the levers via the main spring 125 and the back up spring 126. Under light loading the whole force is transferred via the main spring 125 which is the lighter of the two. As the load is increased the main spring 125 bends until it contacts the back up spring 126. Both springs then work together, the thickness of the springs being calculated so that at a certain overload weight an overload stop 134 strikes the base plate 133. This limits the amount of force which can be applied to the wire. For bathroom scales with maximum reading of 20 stones the limit may for example be set at 25 stones.

The zeroing arrangement will now be described.

A preload is applied to the wire 120 by means of four hold down springs (not shown) on the main top plate 129. These springs provide about 80% of the desired preload on the wire, the rest being applied directly to the bottom of the pulley 123 by the zeroing spring 135. The tension can be varied by means of the zeroing screw 136, tapped block 137 and angle bracket 138 which is secured to the base frame member 132. This allows the preload to be precisely adjusted to give a 400 Hz resonance frequency to the wire and thus a zero reading. In order that the wire does not slip on the pulley the small rod 122 is soldered to the wire and positioned in a cut out in the pulley.

Figure 10:
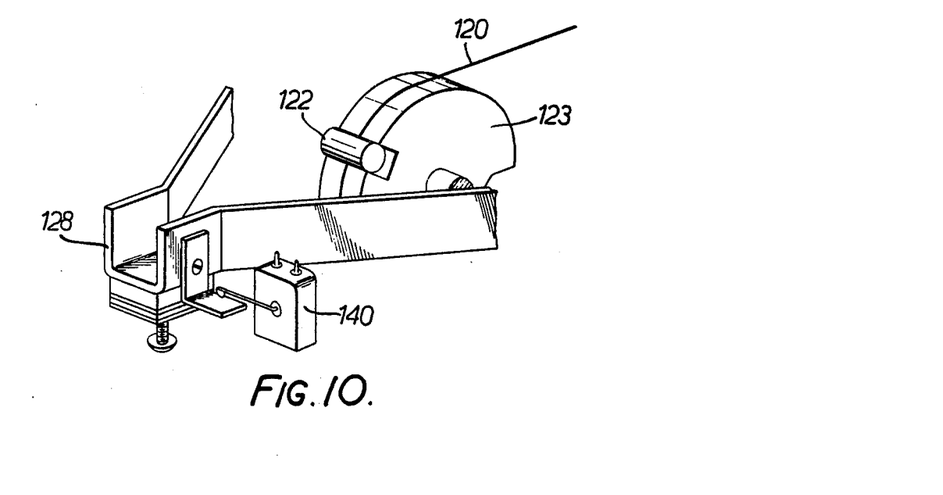
FIG. 10 shows a microswitch arrangement for switching on the electronic circuitry only when a weight is applied to the apparatus.

With reference now to FIG. 10, in order that the scales only switch on when required a microswitch 140 is provided to preserve battery life. Referring also to the previous descriptions of the overload system it was mentioned that the main spring 125 was lighter than the back up spring 126. This is to ensure that at light loads there is some movement (about 5 mm) of the main levers 128. A bracket is attached to the main lever running point 128 which acts on the very light action microswitch 140.

In practice, the microswitch is biased downwards and follows the bracket by spring pressure.

An alternative method which could provide a cheaper solution is to insulate the main (125) and back up (126) springs from each other by insulating spacers and then they could be used as the switch. When sufficient weight is applied the two springs come into contact. The springs should in this case be preferably made from berylium copper or similar and they may require a special coating at the contact points.

Figure 11:
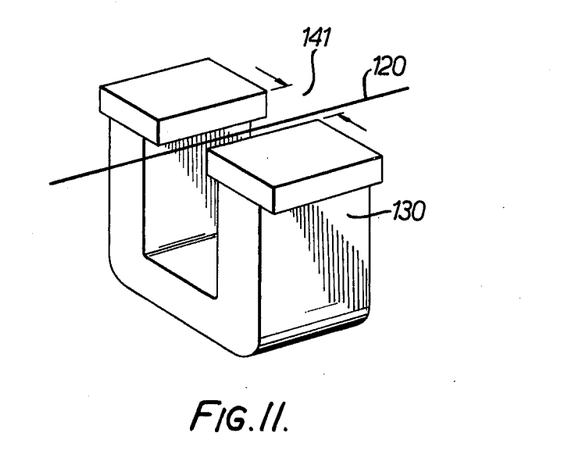
FIG. 11 shows in greater detail, the magnet structure and illustrates the air gap.

In a practical system there are optimum values for field strength, airgap 141 and wire preload. In a preferred system a field strength of approximately 2500 Gauss, 6 mm airgap and wire preload of 2.0 kg was used. The airgap of 6 mm is chosen to give a minimum transverse force on the wire and allows maximum positional tolerance on the wire for satisfactory operation. The wire used was high tensile strength steel piano wire of diameter 0.018 inches.

The weight measuring apparatus described can, of course, be used to provide a measurement of stress or tension and references to weight measurement should include both stress and tension measurement.

What is claimed is:

1. Apparatus for weight measurement comprising a wire mounted for tensioning by a weight to be measured, means for resonating said wire including a fixed anchorage point, a semi-circular pulley, in which said wire is fastened to said fixed anchorage point and is stretched over said pulley and connected to a spring loaded anchorage point, said weight being applied to said wire via said spring loaded anchorage point, means for measuring the frequency of resonation, at least one programmable read only memory (PROM) fed from the means for measuring the frequency of resonation and programmed to provide output signals indicative of the weight applied to the wire, and digital display means connected to said output signals from said PROM.

2. Apparatus for weight measurement as claimed in claim 1, said apparatus being battery powered and including a switch responsive to the application of said weight for switching on the digital display means.

3. Apparatus for weight measurement as claimed in claim 1 in which the wire carries a D.C. current, the wire being placed in the field of an electric coil to which the A.C. current is fed, the coil to which the A.C. current is fed being included in a positive feedback loop to maintain said wire at its resonant frequency and to produce an electrical signal for measurement.

4. Apparatus for weight measurement as claimed in claim 1 in which a binary counter is provided for counting the frequency of resonation signals from the counter being fed to the PROM which is arranged to feed via a latch decoder an L.E.D. display.

5. Apparatus for weight measurement as claimed in claim 1, in which said means for resonating the wire further includes means for vibrating said wire, a sensor for sensing the frequency of vibration, the sensor and transducer being connected in a positive feedback loop whereby the wire is maintained in oscillation at its resonant frequency.

6. Apparatus for weight measurement as claimed in claim 5 in which the wire is arranged to carry an A.C. current, the means for vibrating the wire comprising a magnet positioned adjacent the wire so that the wire is constrained to vibrate when the A.C. current is passed through it, the sensor comprising a pickup coil positioned in the vicinity of the wire so as to have induced in it a voltage at the frequency of vibration, the induced voltage being amplified and applied back to the wire to produce a positive feedback A.C. current to maintain said wire at its resonant frequency and to produce an electrical signal for measurement.

7. Apparatus for weight measurement as claimed in claim 1 in which said spring arrangement comprises a first relatively light spring to which said wire is anchored and a second heavier spring which is contactable by said first relatively light spring when a predetermined weight is applied.

8. Apparatus for weight measurement as claimed in claim 7 in which an overload protection arrangement is provided for said spring arrangement.

9. Apparatus for weight measurement as claimed in claim 7 in which said switch is responsive to movement of said first relatively light spring to effect the switching on of said display means.

* * * * *